(12) United States Patent
Balasaygun et al.

(10) Patent No.: US 8,285,858 B2
(45) Date of Patent: Oct. 9, 2012

(54) SIGNALING USING BINARY FORM OF SIP MESSAGES

(75) Inventors: Mehmet C. Balasaygun, Freehold, NJ (US); Robert C. Steiner, Broomfield, CO (US)

(73) Assignee: Avaya Inc., Basking Ridge, NJ (US)

( * ) Notice: Subject to any disclaimer, the term of this patent is extended or adjusted under 35 U.S.C. 154(b) by 11 days.

(21) Appl. No.: 12/489,574

(22) Filed: Jun. 23, 2009

(65) Prior Publication Data

US 2010/0325291 A1    Dec. 23, 2010

(51) Int. Cl.
*G06F 15/16* (2006.01)
(52) U.S. Cl. .......................................... 709/228
(58) Field of Classification Search .................. 709/203, 709/228; 370/389
See application file for complete search history.

(56) References Cited

U.S. PATENT DOCUMENTS

| | | | |
|---|---|---|---|
| 6,115,721 A | 9/2000 | Nagy | |
| 6,625,718 B1 * | 9/2003 | Steiner | 711/220 |
| 2001/0007107 A1 | 7/2001 | Yamaguchi | |
| 2003/0236892 A1 * | 12/2003 | Coulombe | 709/228 |
| 2005/0175030 A1 * | 8/2005 | Moon et al. | 370/465 |
| 2005/0243747 A1 | 11/2005 | Rudolph | |
| 2006/0089966 A1 * | 4/2006 | Stille et al. | 709/203 |
| 2006/0165043 A1 | 7/2006 | Yoon | |
| 2006/0183491 A1 | 8/2006 | Gundu et al. | |
| 2006/0209775 A1 | 9/2006 | Lim et al. | |
| 2006/0268857 A1 | 11/2006 | Bessis et al. | |
| 2007/0121596 A1 | 5/2007 | Kurapati et al. | |
| 2007/0153775 A1 | 7/2007 | Renschler | |
| 2007/0198681 A1 * | 8/2007 | Bakke et al. | 709/223 |
| 2007/0258451 A1 * | 11/2007 | Bouat | 370/389 |
| 2009/0157596 A1 | 6/2009 | Couch et al. | |

OTHER PUBLICATIONS

U.S. Appl. No. 12/489,569, filed Jun. 23, 2009, Balasaygun et al.
Official Action for U.S. Appl. No. 12/489,569, mailed Apr. 19, 2011 12 pages.

* cited by examiner

*Primary Examiner* — Ario Etienne
*Assistant Examiner* — Hee Soo Kim
(74) *Attorney, Agent, or Firm* — Sheridan Ross P.C.

(57) ABSTRACT

Methods, devices, and systems are provided for negotiating the usage of a binary object representation of SIP messages. More specifically, the negotiation for the binary SIP transmission can be done by exchanging text-based SIP messages or other similar messages over standard SIP connection channels. If the negotiation is successful, then binary SIP messaging may be employed to enhance the ease and efficiency with which a SIP message is generated, transmitted over a communication network, and parsed/processed by a SIP network element.

19 Claims, 3 Drawing Sheets

SIGNALING USING BINARY FORM OF SIP MESSAGES

FIELD OF THE INVENTION

The invention relates generally to communications and more specifically negotiating binary SIP communications.

BACKGROUND

Session Initiation Protocol (SIP) is an open signaling protocol for establishing many kinds of real-time communication sessions. Examples of the types of communication sessions that may be established using SIP include voice, video, and/or instant messaging. These communication sessions may be carried out on any type of communication device such as a personal computer, laptop computer, Personal Digital Assistant (PDA), or similar type of device. One key feature of SIP is its ability to use an end-user's Address of Record (AOR) as a single unifying public address for all communications. Thus, in a world of SIP-enhanced communications, a user's AOR becomes their single address that links the user to all of the communication devices associated with the user. Using this AOR, a caller can reach any one of the user's communication devices, also referred to as User Agents (UAs) without having to know each of the unique device addresses.

SIP provides a comprehensive framework for building various kinds of communication services using text-based messages defined in RFC 3261, the entire content of which is hereby incorporated herein by reference. While text-based representation of SIP messages is useful for debugging, space usage and computation-wise, text-based messaging system is expensive on network elements that communicate over SIP. Specifically, in order to decode an incoming SIP message, often SIP stacks allocate a lot of different dynamically-instantiated memory locations to represent the SIP message in a form that can be represented using the native software technologies. Most often the dynamically allocated memory space is deleted immediately or shortly after the SIP message is processed by the receiving UA. The scope of memory allocations and parsing/formatting time spent for processing txt-based SIP messages is quite large for servers that provide service to large number of network devices and applications. When a series of servers are connected, for instance, each message may be converted from an object representation to text representation (formatting), or converted from text to object representation (parsing) many times as the message moves end-to-end through many different SIP proxy servers, or SIP back-to-back User Agents. This parsing/formatting accounts for a large amount of the total processing time and restricts the maximum throughput of real-time systems.

SUMMARY

Embodiments of the present invention provide a mechanism for negotiating the use of binary SIP messages. Details and efficiencies provided by utilizing a binary SIP message are described and defined in U.S. patent application Ser. No. 12/489,569, entitled "Mechanism for Temporal Building and Parsing SIP Messages" and assigned, the entire contents of which are hereby incorporated herein by reference.

It is one aspect of the present invention to provide an approach signaling negotiation and other transmission techniques needed to make binary SIP transmission possible. Specifically, embodiments of the present invention provide SIP signaling negotiation techniques.

It is another aspect of the present invention to provide an initiation of binary SIP protocol exchange between two adjacent SIP-based network elements.

It is another aspect of the present invention to provide a binary SIP carriage payload.

It is another aspect of the present invention to provide a hardware-awareness mechanism (e.g., little-endian versus big-endian) and instruments for leveraging such a mechanism.

It is another aspect of the present invention to provide different software development technologies (e.g., C/C++ and Java-based software implementation) and required support for binary SIP transmission between C++-based and Java-based network elements.

In accordance with at least some embodiments of the present invention, a method is provided that generally comprises:

sending, by a first SIP network element, a first message to a second SIP network element, the first message including a request to establish a first communication session using binary SIP messages;

receiving, at the first SIP network element, a response to the first message from the second SIP network element;

determining, by the first SIP network element, whether to communicate with the second SIP network element at least using binary SIP messages.

The term "computer-readable medium" as used herein refers to any tangible storage and/or transmission medium that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the invention is considered to include a tangible storage medium or distribution medium and prior art-recognized equivalents and successor media, in which the software implementations of the present invention are stored.

The terms "determine," "calculate" and "compute," and variations thereof, as used herein, are used interchangeably and include any type of methodology, process, mathematical operation or technique.

The term "module", "agent", or "tool" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

The preceding is a simplified summary of embodiments of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

DETAILED DESCRIPTION

The invention will be illustrated below in conjunction with an exemplary communication system. Although well suited for use with, e.g., a system using a server(s) and/or data base(s), the invention is not limited to use with any particular type of communication system or configuration of system elements. Those skilled in the art will recognize that the disclosed techniques may be used in any communication application in which it is desirable to negotiate the use of binary messages, such as SIP messages and any other messages generated in any other communication protocol.

The exemplary systems and methods of this invention will also be described in relation to analysis software, modules, and associated analysis hardware. However, to avoid unnecessarily obscuring the present invention, the following description omits well-known structures, components and devices that may be shown in block diagram form, are well known, or are otherwise summarized.

For purposes of explanation, numerous details are set forth in order to provide a thorough understanding of the present invention. It should be appreciated, however, that the present invention may be practiced in a variety of ways beyond the specific details set forth herein.

Figure 1:
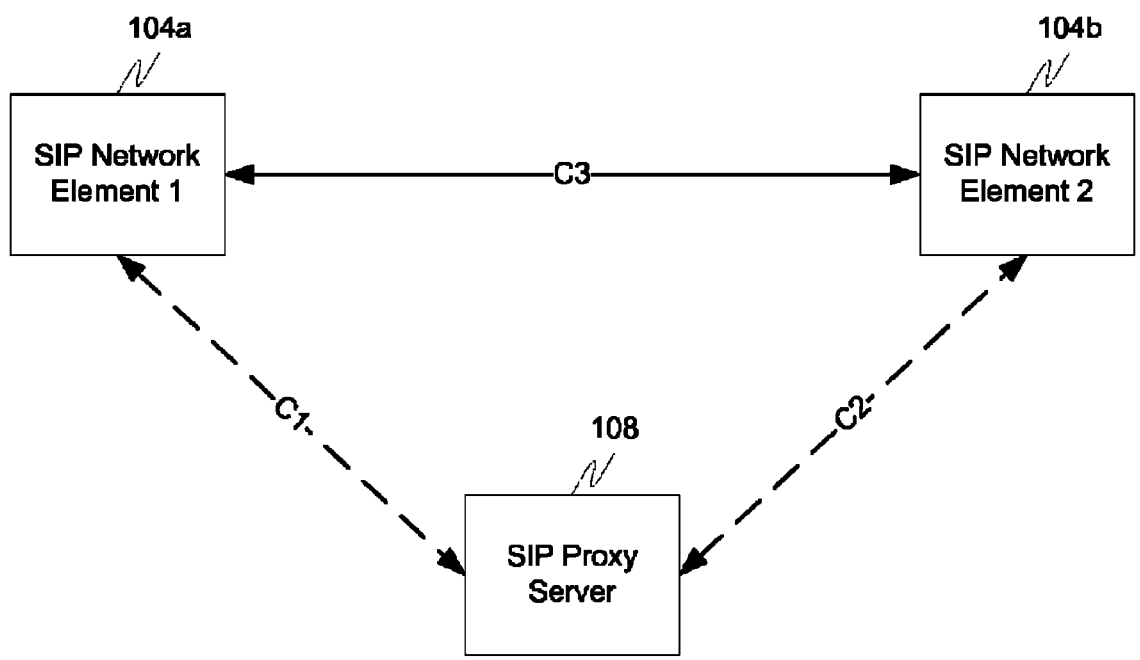
FIG. 1 is a block diagram depicting a communication system in accordance with embodiments of the prior art.

With reference to FIG. 1, an exemplary communication system 100 will be described in accordance with at least some embodiments of the present invention. More specifically, the communication system 100 includes at least two SIP network elements 104a, 104b which are capable of communicating via SIP messages. In accordance with at least some embodiments of the present invention the SIP network elements 104a, 104b may be adapted to communicate with one another using any type of binary SIP message or binary SIP stack. Generally speaking, the communication path between the SIP network elements 104a, 104b may be created through any type of communication network.

SIP signaling connectivity may also be established between the SIP network elements 104a, 104b through one or more proxy servers 108. If the first SIP network element 104a desires to initiate a request to the second SIP network element 104b, the request is typically routed through the proxy server 108 via connections C1 and C2. Use of a proxy server 108 may not be necessary, however, if the first SIP network element 104a is provisioned with the network address of the SIP network element 104b and both SIP network elements 104a, 104b are provisioned with a policy to communicate with one another directly (C3—connection 3), thus by-passing their outbound proxy server 108. This provisioning may occur as the result of caching previously negotiated communication parameters used between the SIP network elements 104a, 104b or by user provisioning. A user provisioning may be regarded as a recommendation and may or may not actually lead to the use of binary messages.

As can be appreciated by one skilled in the art, the SIP network elements 104a, 104b may be adapted to communicate using traditional text-based SIP messages. Furthermore, in accordance with at least some embodiments of the present invention, the SIP network elements 104a, 104b may be adapted to communicate using binary SIP messages. To this extent it may become necessary for the SIP network elements 104a, 104b to negotiate the possible use of binary SIP messages.

The use of binary SIP signaling introduces additional connectivity options that do not exist in a network environment where text-based SIP messages are exchanged. Specifically, the negotiation for and use of the binary SIP transmission option is done on a hop-by-hop basis. In the simple network topology shown above, any combination of C1, C2 or C3 may support binary SIP transmission. To provide the most flexible deployment and interoperability options, all SIP network elements that support binary SIP transmission should also support conventional text-based SIP transmission.

As used herein, the SIP network elements 104a, 104b may include any type of communication device or component within a communication device adapted to communicate using SIP messages. As one example, one or more of the SIP network elements 104a, 104b may comprise an endpoint (e.g., user devices adapted to allow a user to send and receive voice, video, text, and other data communications to/from another SIP network element, which may or may not also be an endpoint supporting the communications of another user). As another example, one or more of the SIP network elements 104a, 104b may comprise a server or components within the same server. Thus, communications between SIP network elements may be characterized as endpoint-to-endpoint communications, endpoint-to-server communications, and server-to-server communications.

Any of the well-known transport protocols such as UDP/IP, TCP/IP, or TLS/TCP/IP can be used to carry binary SIP messages. However, use of connection-oriented protocols such as TCP/IP and TLS/TCP/IP is more desirable in terms of avoiding packet fragmentation issues. With the connection-oriented approach, the socket ports used by the binary SIP signaling peers can be either a well-known port number registered for/dedicated to binary SIP transmission, standard (text-based) SIP signaling ports, or negotiated port numbers, as explained in further detail herein.

Embodiments of the present invention do not make an assumption as to which of the three options is used. However, in order to simplify the logic on the receiving end of the binary SIP messages, it may be more convenient to use a separate socket port dedicated for binary SIP packets, instead of overloading the standard SIP port to exchange SIP messages in either text- or binary-form.

Text-based SIP message structures carry message length information via the combination of Content-Length and double carriage return/line feed characters (an empty line) to separate a SIP message header's from the message body. A similar message boundary detection mechanism can be used for the binary SIP messages. However, the easiest way to provide this is by encapsulating binary SIP messages in an envelop protocol. There are different envelop protocols that exist in the industry and embodiments of the present invention are independent of the particular encapsulation protocol used for transmission as long as appropriate negotiation between SIP signaling peers is done to select a particular encapsulation protocol. The envelope may be as simple as a 2 byte prefix length field. For the purposes of subsequent discussion in this document, tpkt encapsulation is referred to as the encapsulation protocol over TCP or TLS connections. It should be noted that by having a length field or encapsulation, the total length of the message is known immediately, eliminating the partial message parsing issues in text messaging. However, it may be necessary for the receiver to scan for a blank line, if the devices are currently in text mode, to know where the headers end.

The SIP network elements 104a, 104b that are engaged in binary SIP transmission must first agree on the byte-ordering used for the binary data. This can be done during binary signaling negotiation. Specifically, the two peers should agree on whether to use little-endian or big-endian (a.k.a., network byte ordering) in the binary SIP messages. During this negotiation phase of the binary SIP protocol, the initiator of the connection link can request a specific byte ordering that is natively supported in its own hardware environment. The receiver of the connection request may then choose to accept the incoming byte-ordering or propose a different byte-ordering technique. In cases where the two ends of the binary signaling link have different byte-ordering preferences, it is expected that one of the signaling peers will need to agree to do byte-order swap in order to keep binary transmission, or switch to standard SIP signaling in text-based form.

However, it is expected that the byte-order swap used in connection with a binary SIP message is expected to cost less than formatting/parsing text-based SIP messages. Therefore, the signaling peers that can exchange SIP message in binary form would normally stay with binary transmission, with one of the peers doing the byte-order swapping. Since little-endian is becoming the most common on 64-bit platforms, this will be the most likely default endian. However, embodiments of the present invention are not so limited and one skilled in the art can appreciate that any other default may be used.

The negotiation for the binary SIP transmission can be done by exchanging text-based SIP messages over standard SIP connection channels. For server-to-server communication, the negotiation for the binary transmission can be done using the SIP OPTIONS request (although not limited to the use of the OPTIONS message, that is, any other SIP message type can be used). For endpoint-server communication where endpoints are expected to register with the SIP infrastructure, a SIP REGISTER request can be used to negotiate for binary SIP transmission as well. In order to carry binary SIP parameters from one peer to the next, any SIP header or header parameters can be used. One of the alternatives is to expand the scope of the Accept-Encoding header (RFC 3261) to include an option for using the binary transmission.

Specifically, the following information can be included or shared between peers in the initial text-based SIP message exchange as part of the negotiation:

Encoding type: This is a field which is set to "sip-binary" to indicate that the entire SIP messages (headers and content) used in a communication session will be carried in binary form.

UAS port: This is an optional field indicating which port the message initiator is expecting to receive binary SIP messages at. When omitted, default binary SIP port may be assumed by the receiver. The port used for exchanging binary SIP messages may or may not be the same port used to exchange text-based SIP messages.

Byte-ordering: This is an optional field indicating whether the message initiator supports "little-endian" or "big-endian". When omitted, "little-endian" is generally assumed by default.

Encapsulation type: Field indicating the encapsulation technique the message initiator supports. When tpkt is used for encapsulation, a separate parameter about the ID used in tpkt packets will likely need to be signaled.

Figure 2:
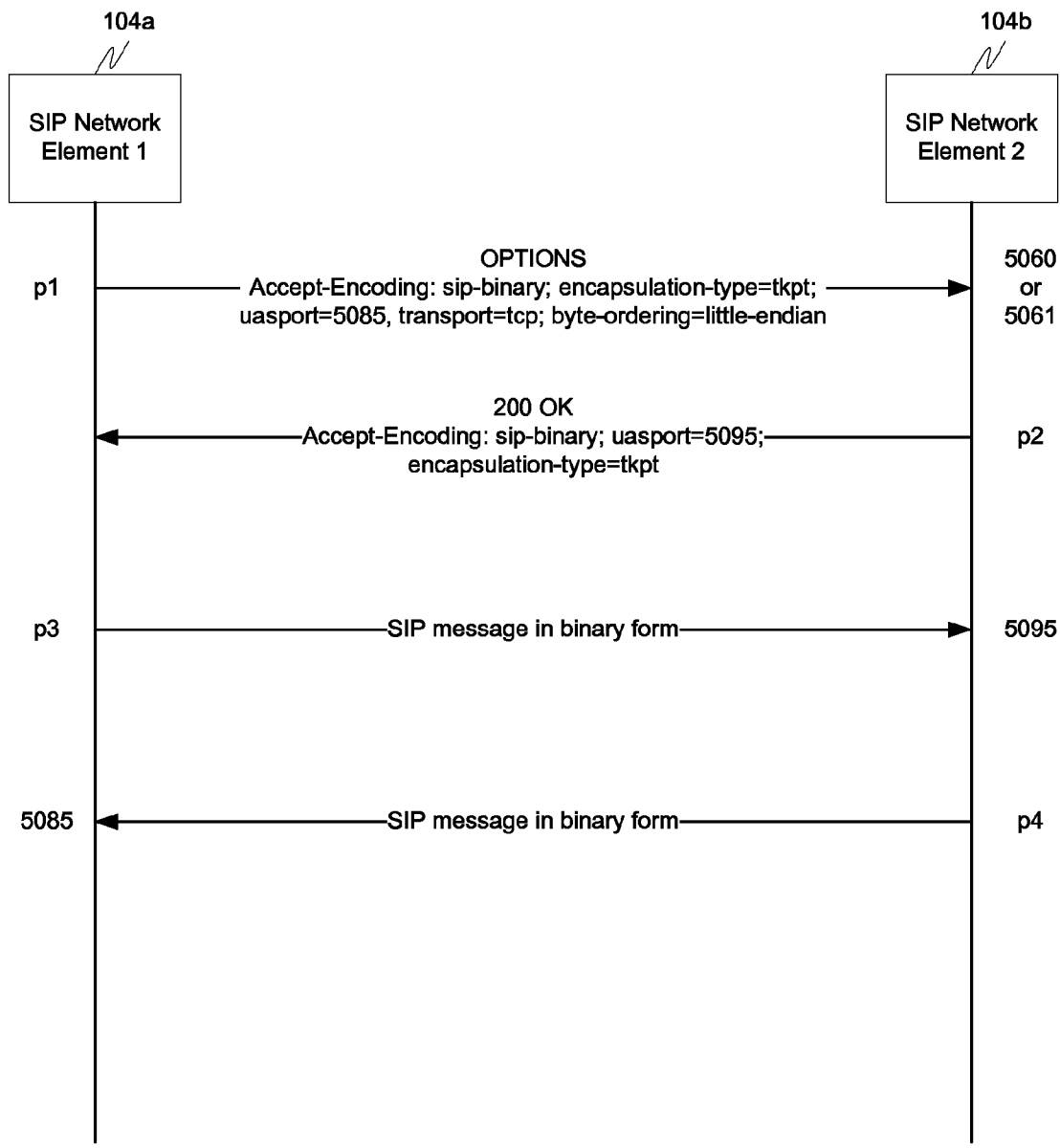
FIG. 2 is a block diagram depicting a message exchange between SIP Network Elements in accordance with at least some embodiments of the present invention.

With reference now to FIG. 2, a sample call flow used to establish a binary SIP transmission connection will be described in accordance with at least some embodiments of the present invention. It should be noted that if the receiving SIP network element 104 does not support binary SIP transmission, it would reject the message by replying with a 415 "Unsupported Media Type" response, as per RFC 3261. The SIP signaling would then continue using text-based SIP messages. It should be noted that the ports p1, p2, p3, and p4 depicted in FIG. 4 may correspond to ephemeral ports of the SIP network elements 104a, 104b.

The initial step in negotiation is for the first SIP network element 104a to generate and send a first message (usually a text-based SIP message) to its intended counterparty or peer, which is the second SIP network element 104b in this case. As noted above, the first SIP message may be sent directly to the second SIP network element 104b or may be sent via a proxy 108. In the embodiment depicted in FIG. 2, the first SIP network element 104a generates and sends a SIP OPTIONS message. The content of the message, in the body and/or one or more headers, identifies parameters for negotiating a binary SIP communication session. More specifically, this first message may identify one or more of (i) encoding type, (ii) encapsulation type, (iii) a port of the first SIP network element 104a to be used if a binary SIP communication session is established, (iv) transport type, and (v) byte-ordering.

Upon receiving the first message, the second SIP network element 104b determines whether it is capable and/or desires to communicate with the first SIP network element 104a using binary SIP messages. If the second SIP network element 104b makes a positive determination to this extent (i.e., decides that it is capable of using and desires to use binary SIP messages to communicate with the first SIP network element 104a), then the second SIP network element 104b generates and sends a response message back to the first SIP network element 104a. In the embodiment depicted in FIG. 2, the response message is in the form of a 200 OK message, which identifies negotiation parameters indicating one or more of (i) the second SIP network element's 104b desire to communicate with binary SIP messages, (ii) a port of the second SIP network element 104b to be used for binary communications, (iii) an indication or affirmation to comply with the proposed byte-ordering and encapsulation type of the first SIP network element 104a (which may also be in the form of a non-response to the first SIP network element's 104a proposed parameters), and (iv) an indication of a desire to use a different byte-ordering or encapsulation type than was proposed by the first SIP network element 104a.

Once the first SIP network element 104a receives the response from the second SIP network element 104b, the first SIP network element 104a will begin generating and sending SIP messages to the second SIP network element 104b in accordance with the negotiated parameters, which may or may not include the use of binary SIP messages.

The first and/or second SIP network elements 104a, 104b may also be adapted to cache (i.e., store in internal memory)

the negotiated parameters, particularly if a binary SIP communication session is established. However, the negotiated parameters may also be cached if a binary SIP communication session is not established. The cached parameters may be maintained indefinitely or may be purged after a predetermined amount of time in an effort to efficiently manage memory utilization.

Figure 3:
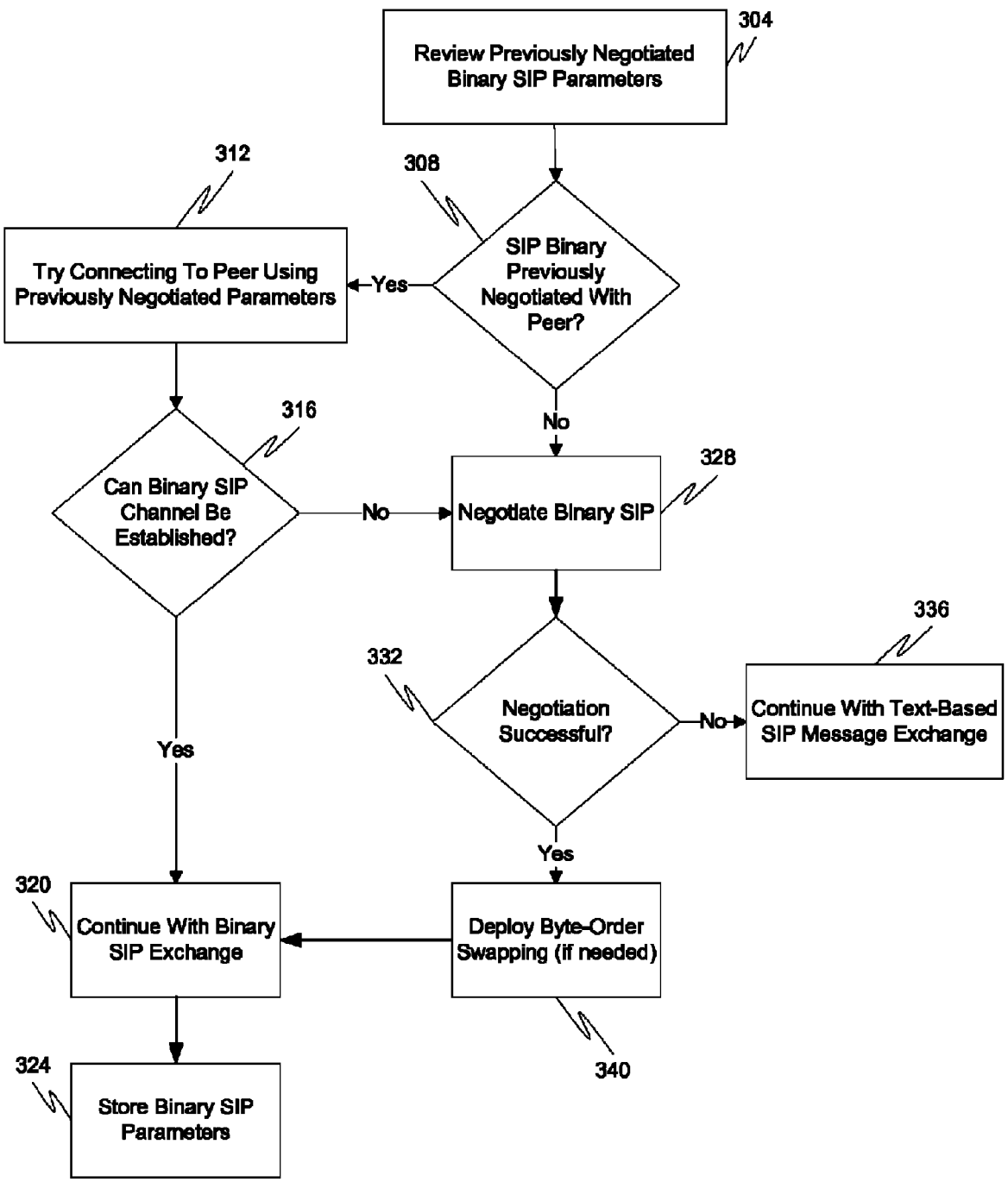
FIG. 3 is a flow diagram depicting a method of negotiating communication parameters in accordance with at least some embodiments of the present invention.

From a process point of view, one method for establishing binary SIP transmission is shown in FIG. 3. The method begins when a first SIP network element 104a decides that it wants to try and establish a binary SIP transmission with a second SIP network element 104b. In accordance with at least some embodiments of the present invention, it is possible for the originator of the binary SIP transmitter to cache binary SIP capabilities of its peer to skip the binary setup negotiation step. This may hold particularly true if one assumes that the SIP network elements 104a, 104b do not change dramatically overtime, especially in the server topology area. While this caching may grow to be large for endpoint-to-proxy server links and may not be practical to cache it on the server side, it may be practical to cache a proxy server's binary SIP capabilities on the endpoint side. Similarly, a server may have a limited set of servers it may communicate with, thus limiting the size of the cache that needs to be maintained in a server. In these particular instances it may be more beneficial to cache previously negotiated parameters and leverage such parameters at a later time.

Therefore, when the first SIP network element 104a decides to try and establish a binary SIP transmission with the second SIP network element 104b, the first SIP network element 104a reviews its cached parameters (step 304). Based on this review, the first SIP network element 104a determines whether it has cached any binary SIP transmission parameters for the second SIP network element 104b (step 308).

If this inquiry is answered affirmatively, then the first SIP network element 104a tries to connect with the second SIP network element 104b using the previously negotiated and cached parameters (step 312). This particular step may be executed by the first SIP network element 104a generated a binary SIP message in accordance with the cached parameters and sending the binary SIP message to the second SIP network element 104b. If the cached parameters are still supported by the second SIP network element 104b and the second SIP network element responds to the binary SIP message using the same parameters (as determined in step 316), then the two SIP network elements will continue with a binary SIP exchange for some or all of the rest of their communication session (step 320). As can be appreciated, however, the SIP network elements 104a, 104b may have previously negotiated that text-based messages should be used. In this embodiment, the first SIP network element 104a may not attempt to re-negotiate the use of binary SIP messages. It could, however, be renegotiated every other time, or after a predetermined amount of time or if a change in device is detected.

If, however, a binary SIP channel cannot be established (as determined in step 316) or if the first SIP network element 104a has no cached parameters for the second SIP network element 104b, then the method continues with the first and second SIP network elements 104a, 104b attempting to negotiate binary SIP transmission parameters (step 328). This particular step is similar to the negotiation process discussed in connection with FIG. 2, although other similar negotiation processes may also be employed.

In step 332 it is determined if the negotiation of a binary SIP transmission was successful. If this inquiry is answered negatively, then the SIP network elements 104a, 104b conduct their communication session using text-based SIP messages to the exclusion of binary SIP messages (step 336). If, however, the inquiry is answered affirmatively, then the method continues with the SIP network elements 104a, 104b deploying byte-order swapping, if such an action is necessary (step 340). Thereafter, the method continues to step 320 where a communication session is conducted using binary SIP messages either alone or in combination with one or more text-based SIP messages. Additionally, one or both SIP network elements 104a, 104b may be adapted to store the binary SIP parameters that are being used in connection with the binary SIP exchange of messages (step 324).

The success of a binary SIP message exchange between two SIP peers may depend on how efficiently the binary message can be created and parsed. When different software technologies are used at each end of a binary SIP connection, the computation and memory cost-savings that can be achieved at each end of the signaling path is reduced. In present-day software development technologies, the two prevalent software technologies are C/C++ and Java. For a SIP network element with a Java SIP stack, the benefits for memory and processing optimizations cannot be as good as the cost savings achieved by the use of C/C++ software technologies. The primary reason for this from a transmission perspective is that the strings in Java are represented in Unicode, but in SIP, the strings are UTF-8 encoded for transmission. In addition, on the formatting/parsing side, the transmission presented here does not require serialization/deserialization that would otherwise be required on the Java side because the memory management techniques are generally left up to the virtual machine hosting the Java application.

In order to avoid this performance impact, it is possible to implement a binary C/C++ SIP stack and interface this stack with higher-level Java application using Java Native Interface (JNI) and/or Java Connector Architecture. In addition, the API layer between a binary C/C++ stack and Java can be made compatible with an appropriate Java JSR recommendation, to make the Java side application implementation transparent from the underlying stack technology.

While the above-described flowchart and message exchange have been discussed in relation to a particular sequence of events, it should be appreciated that changes to this sequence can occur without materially effecting the operation of the invention. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

The systems, methods and protocols of this invention can be implemented on a special purpose computer in addition to or in place of the described communication equipment, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a communications device, such as a server, personal computer, any comparable means, or the like. In general, any device capable of implementing a state machine that is in turn capable of implementing the methodology illustrated herein can be used to implement the various communication methods, protocols and techniques according to this invention.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The analysis systems, methods and protocols illustrated herein can be readily implemented in hardware and/or software using any known or later developed systems or structures, devices and/or software by those of ordinary skill in the applicable art from the functional description provided herein and with a general basic knowledge of the communication and computer arts.

It is therefore apparent that there has been provided, in accordance with embodiments of the present invention, systems, apparatuses and methods for negotiating communication settings. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

What is claimed is:

1. A method, comprising:
sending, by a first SIP network element, a first message to a second SIP network element, the first message including a request to establish a first communication session using binary SIP messages and further including negotiation information including byte-ordering negotiation information;
receiving, at the first SIP network element, a response to the first message from the second SIP network element;
determining, by the first SIP network element, whether to communicate with the second SIP network element using at least one binary SIP message, the at least one binary SIP message including a self-relative pointer that points from a fixed portion of the at least one binary SIP message to a variable portion of the at least one binary SIP message, wherein the first message comprises a SIP message and the self-relative pointer comprises a scalar value in the fixed portion that identifies a distance from the fixed portion to a corresponding object in the variable portion, and wherein the corresponding object comprises information used to route the at least one binary SIP message across the communication network to the second SIP network element.

2. The method of claim 1, wherein the first SIP network element determines that binary messages will be used to communicate with the second SIP network element, the method further comprising:
generating a binary message; and
transmitting the binary message to the second SIP network element.

3. The method of claim 1, wherein the first SIP network element comprises an endpoint and wherein the first message comprises a SIP REGISTER request.

4. The method of claim 1, wherein the first SIP network element comprises a server and wherein the first message comprises a SIP OPTIONS request.

5. The method of claim 1, wherein the first message further includes negotiation information for a UAS port which corresponds to a separate socket port dedicated for binary SIP packets.

6. The method of claim 1, further comprising:
caching negotiation parameters used for the communication session between the first and second SIP network elements.

7. The method of claim 6, further comprising:
determining, by the first SIP network element, that a second communication session with the second SIP network element is desired; and
attempting to establish the second communication session with the cached negotiation parameters.

8. The method of claim 7, further comprising:
determining that the cached negotiation parameters cannot be used to establish the second communication session; and
negotiating, by the first SIP network element, new communication parameters with the second SIP network element.

9. A communication device adapted to send a first SIP message to a SIP network element, the first message including a request to establish a first communication session using binary SIP messages and further including negotiation information including byte-ordering negotiation information, receive a response to the first SIP message from the SIP network element, and determine whether to communicate with the SIP network element using binary SIP messages, at least one of which includes a self-relative pointer comprising a scalar value in a fixed portion of the binary SIP message that identifies a distance from the fixed portion to a corresponding object in a variable portion of the binary SIP message, wherein the object comprises information used to route the first SIP message across the communication network to a target communication device.

10. The device of claim 9 further adapted to determine that binary SIP messages will be used to communicate with the SIP network element, generate a binary SIP message, and transmit the binary SIP message to the SIP network element.

11. The device of claim 10, wherein the binary SIP message is generated using an object-oriented programming language.

12. The device of claim 10, wherein the binary SIP message is generated using a class-based programming language.

13. The device of claim 9, wherein the first message comprises a SIP OPTIONS request.

14. The device of claim 13, wherein the first message further includes negotiation information for a UAS port which corresponds to a separate socket port dedicated for binary SIP packets.

15. The device of claim 9 further adapted to cache negotiation parameters used for the communication session with the SIP network element, wherein the cached negotiation parameters are useable by the device for future communication sessions.

16. A computer program product comprising computer executable instructions stored onto a non-transitory computer readable medium which, when executed by a processor of a computer, cause the processor to execute a method, the method comprising:
generating a first message for transmission to a SIP network element, the first message being a SIP message and including a request to establish a first communication session using binary SIP messages and further including negotiation information including byte-ordering negotiation information;
causing the first message to be transmitted to the SIP network element;
analyzing a response to the first message from the SIP network element; and based on the analysis of the response to the first message, determining whether to communicate with the SIP network element using at least one binary SIP message that includes a self-relative pointer comprising a scalar value in a fixed portion of the at least one binary SIP message that identifies a distance from the fixed portion to a corresponding object in a variable portion of the at least one binary SIP message, and wherein the object comprises information used to route the at least one binary SIP message across the communication network to the SIP network element.

17. The computer program product of claim 16, wherein the method further comprises:
caching negotiation parameters used for the communication session with the SIP network element;
determining that a second communication session with the SIP network element is desired; and
attempting to establish the second communication session with the cached negotiation parameters.

18. The computer program product of claim 16, wherein the method further comprises:
generating a binary SIP message; and
causing the binary SIP message to be transmitted to the SIP network element.

19. The computer program product of claim 18, wherein the binary SIP message is generated using at least one of an object-oriented programming language and a class-based programming language.

* * * * *